US008979160B1

(12) United States Patent
Pericak et al.

(10) Patent No.: US 8,979,160 B1
(45) Date of Patent: Mar. 17, 2015

(54) SYSTEM AND APPARATUS FOR PROVIDING A SECURE STORAGE COMPARTMENT

(71) Applicant: Ford Global Technologies, LLC, Dearborn, MI (US)

(72) Inventors: David Pericak, Clinton Township, MI (US); John Robert Van Wiemeersch, Novi, MI (US); Kosta Papanikolaou, Huntington Woods, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 74 days.

(21) Appl. No.: 13/974,164

(22) Filed: Aug. 23, 2013

(51) Int. Cl.

| | |
|---|---|
| ***B60R 7/06*** | (2006.01) |
| ***E05B 81/76*** | (2014.01) |
| ***E05B 47/00*** | (2006.01) |
| ***E05B 81/04*** | (2014.01) |
| ***E05B 85/00*** | (2014.01) |
| ***E05B 83/16*** | (2014.01) |
| ***E05B 83/30*** | (2014.01) |
| ***E05B 83/32*** | (2014.01) |
| ***E05B 77/54*** | (2014.01) |
| ***E05B 81/56*** | (2014.01) |

(52) U.S. Cl.
CPC ............. *E05B 81/76* (2013.01); *E05B 47/0001* (2013.01); *E05B 81/04* (2013.01); *E05B 85/00* (2013.01); *E05B 83/16* (2013.01); *E05B 83/30* (2013.01); *E05B 83/32* (2013.01); *E05B 77/54* (2013.01); *E05B 81/56* (2013.01)
USPC ......................... 296/37.12; 224/483; 224/544

(58) Field of Classification Search
USPC .......... 296/37.1, 37.8, 37.12, 37.13; 224/400, 224/483, 543, 544
See application file for complete search history.

(56) References Cited

U.S. PATENT DOCUMENTS

| | | | |
|---|---|---|---|
| 1,641,249 A * | 9/1927 | Blumental | 312/204 |
| 1,885,692 A * | 11/1932 | Dugan | 40/660 |
| 3,081,126 A * | 3/1963 | Theberge | 296/37.1 |
| 6,550,835 B2 * | 4/2003 | Davis et al. | 296/37.12 |
| 7,845,701 B2 | 12/2010 | Mueller | |
| 7,878,035 B2 | 2/2011 | Yamaguchi et al. | |
| 8,511,733 B2 * | 8/2013 | Blackmore et al. | 296/37.12 |
| 2004/0154953 A1 * | 8/2004 | Ravikumar | 206/525 |
| 2006/0028043 A1 * | 2/2006 | Zeidman | 296/37.13 |
| 2007/0241582 A1 * | 10/2007 | McKeever | 296/37.12 |
| 2013/0057012 A1 | 3/2013 | Blackmore et al. | |

* cited by examiner

*Primary Examiner* — Lori L Lyjak
(74) *Attorney, Agent, or Firm* — Raymond L. Coppiellie; Brooks Kushman P.C.

(57) ABSTRACT

A storage compartment in a vehicle is covered by closing a vehicle door over the storage compartment. The storage compartment may be disposed in an end cap, the door, or part of the door frame. An electronic locking system with mechanical latches, a cinching door system, or an electronic latching system with fully electronic latches may be adapted to include a lock override control. The lock override control may be actuated by a graphic view interface, a portable radio frequency switch, or a telematics controller.

17 Claims, 5 Drawing Sheets

SYSTEM AND APPARATUS FOR PROVIDING A SECURE STORAGE COMPARTMENT

TECHNICAL FIELD

This disclosure relates to a system and apparatus for preventing access to a storage compartment that is blocked by a vehicle door when the door is closed.

BACKGROUND

The lock and latch on "lockable" glove boxes, consoles, and other storage compartments in automotive vehicles cabins are designed primarily to deter thefts of opportunity from short-term drivers of the vehicle (e.g., valets, car wash workers, etc.) or to prevent family members (e.g., kids, teen drivers) from gaining access to items for which the vehicle owner wishes to control access. The prime assumption is that the person attempting to open the locked compartment will be stopped if they find it to be locked.

Low security locking mechanisms on these types of storage compartments are not sufficiently robust to resist attack from even a mildly motivated and determined thief who is not hesitant to inflict vehicle damage to open the compartment. For example, a glove box can be easily opened with a crowbar, screwdriver, or some other leveraging device that may be used to wedge the door open. Unfortunately, on some vehicles, such as convertible vehicles, this results in a lack of a highly secure location in the cabin to keep valuables when the customer wishes to park the vehicle with the top down. Further, the same would be true of any vehicle that the customer parks with the windows down while storing items of value in the vehicle.

A motion/inclination system could be used to sound an alarm if significant motion is detected. However, the thief could still rapidly gain access to the locked compartment and leave the site before anyone notices or responds to the alarm. Most original equipment manufacturer (OEM) motion detection systems utilize an ultrasonic sensor and Doppler affect monitor to avoid false triggers from fireworks, thunder, and strong side winds on the vehicle. These ultrasonic systems may not function, or sometimes may not even arm, if a window is down since cabin air movement may be detected by the Doppler affect algorithm and may set-off the alarm.

It would be desirable to have a "valuables safe" in the vehicle that is highly secure from attack or would require a large amount of time to "crack." A valuables safe that does not require significant cost or structural changes to the vehicle to implement could be offered as standard equipment or as a low cost enhancement to an OEM's security system option package. With such a solution, one could still leave a wallet, phone, or other small valuables in the safe with the windows open or the convertible top down.

The above problems and other problems are addressed by this disclosure as summarized below.

SUMMARY

According to one aspect of this disclosure, a secure storage compartment is provided in a vehicle that is covered by a vehicle egress door. Access to the storage compartment is controlled by a door latch, a lock actuator and a lock actuator override control. The door latch has a locked condition and an unlocked condition and holds the door closed over the storage compartment. The lock actuator is used to select between the locked condition and unlocked condition. The lock actuator override control prevents the lock actuator from being placed in the unlocked condition when the lock actuator override control is activated to prevent the door from being opened thereby preventing access to the storage compartment.

According to other aspects of this disclosure, the door latch may include an inside electronic door handle and an outside electronic door handle. The lock actuator override control may be configured to disable the inside electronic door handle and the outside electronic door handle. The inside door handle and the outside door handle may include electronic switches that process a switch command when the override control is deactivated. The switches are prevented from processing the switch command when the lock actuator override control is activated.

According to further aspects of this disclosure, the door latch may include a cinching door system for closing the door. The lock actuator override control may be used to render the cinching door system inoperable in a safe lock mode and operable when not in the safe lock mode. The cinching system has a catch that engages the door to close the door and that releases the door to allow the door to open. The override control when activated prevents the cinching system from releasing the door.

According to another aspect of this disclosure, a system is provided for preventing access to a storage compartment. The system comprises a vehicle door and an override control. The vehicle door is closed to prevent access to the storage compartment. The vehicle door may include an inside electronic door handle and an outside electronic door handle. The override control may be operatively connected to the inside door handle and the outside door handle to selectively render the inside door handle and the outside door handle inoperable in a safe lock mode and operable when not in the safe lock mode.

According to other aspects of the system, the inside door handle and the outside door handle may include electronic switches that process a switch command when the override control is deactivated and are prevented from processing the switch command when the override control is activated. The system may be configured so that the vehicle door that is closed to prevent access to the storage compartment is operatively connected to the override control.

Several different approaches are disclosed for activating and deactivating the override control. The override control may be activated and deactivated by a graphic user interface in the vehicle, a portable radio frequency switch, or a signal sent to a vehicle telematics controller.

According to another aspect of this disclosure, a system is provided for preventing access to a storage compartment that includes a vehicle door that has a cinching system for closing the door. The vehicle door is closed to prevent access to the storage compartment. The override control is operatively connected to the cinching system and renders the cinching door system inoperable in a safe lock mode and operable when not in the safe lock mode. The cinching system has a catch that engages the door to close the door and that releases the door to allow the door to be opened. The override control prevents the cinching system from releasing the door when activated.

The cinching system may include a motor that pulls the door closed to engage a primary latch as the motor rotates in one rotary direction and then returns to an open state in the opposite rotary direction to allow the door to be freely opened when desired. The override control prevents the door from being released by preventing the motor from rotating in the opposite rotary direction. The primary latch may be released by at least one door handle when the override control is not activated and is prevented from releasing when the primary latch is activated.

In addition, because each of the above methods relies on electrical controls to maintain the locking status of the doors, the hood release cable handle may be located on a portion of the door frame or end cap that is concealed when the door is closed. This approach is intended to prevent thieves from just popping the hood to disconnect the battery and remove power and place the doors into back-up release mode (i.e., because of the safety issues of preventing a door from opening, it is preferred to provide alternative release methods when there is a loss of power). Alternatively, it may be preferable to place the fuse box or just the fuse for the locking controls in the door frame or end cap to prevent access. The valuables safe may be placed on a door that does not have a mechanical override on vehicles with e-latches that also use a 100% mechanical back-up release cable and handle for systems designed with 100% electrical locking and latching.

The above aspects of this disclosure and other aspects will be described in greater detail below with reference to the attached drawings.

DETAILED DESCRIPTION

A detailed description of the illustrated embodiments of the present invention is provided below. The disclosed embodiments are examples of the invention that may be embodied in various and alternative forms. The figures are not necessarily to scale. Some features may be exaggerated or minimized to show details of particular components. The specific structural and functional details disclosed in this application are not to be interpreted as limiting, but merely as a representative basis for teaching one skilled in the art how to practice the invention.

Figure 1:
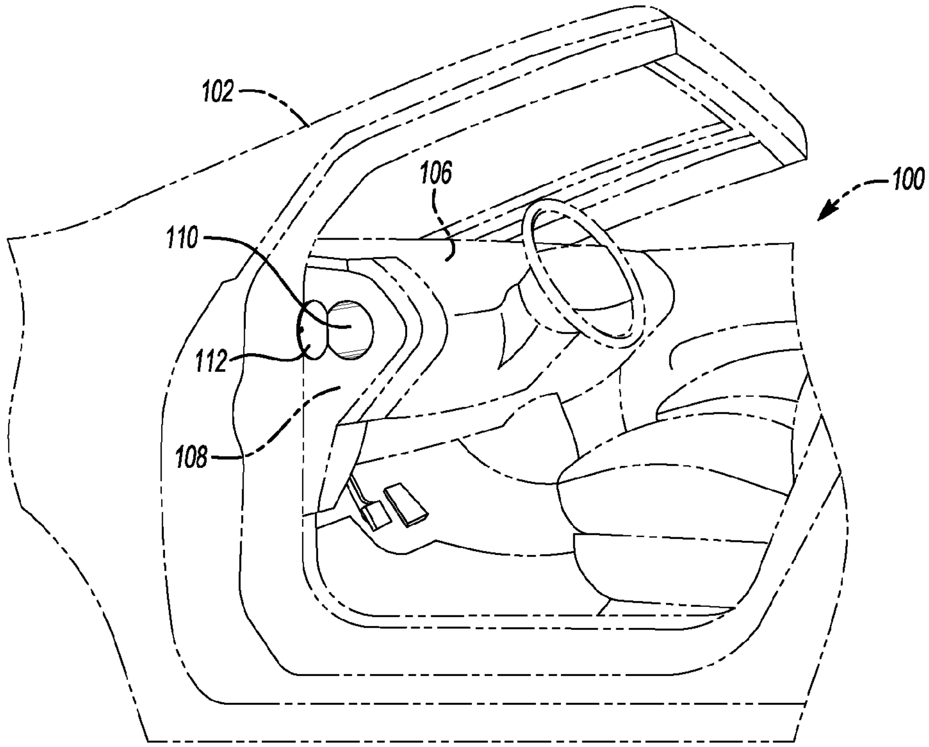
FIG. 1 is a fragmentary view of a vehicle that has an instrument panel end-cap storage compartment that is in an open position.
Figure 2:
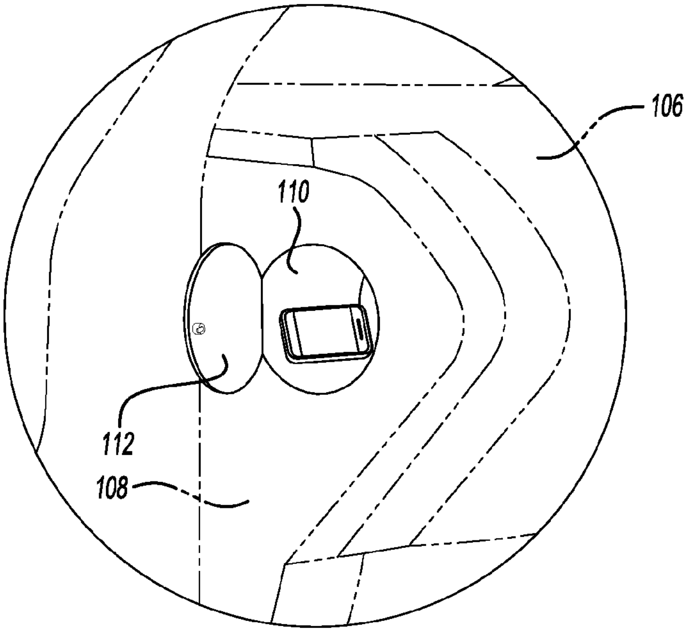
FIG. 2 is an enlarged view of an instrument panel end-cap storage compartment in the open position showing an article stored in the compartment.

Referring to FIGS. 1 and 2, a front seat area 100 of a vehicle 102 is illustrated. A dashboard 106 has an end-cap 108. A storage compartment 110, or valuables safe, is provided in the end-cap 108 and extends into an otherwise unused area in front of the dashboard 106. The storage compartment 110 is provided with a compartment door 112 that retains loose articles within the storage compartment 110. The storage compartment 110 is secured by closing the front driver's door of the vehicle that is not shown in the drawing of FIG. 1, but is described with reference to FIGS. 5-7. A storage compartment 110 and door 112 may also exist on the right end-cap.

Figure 3:
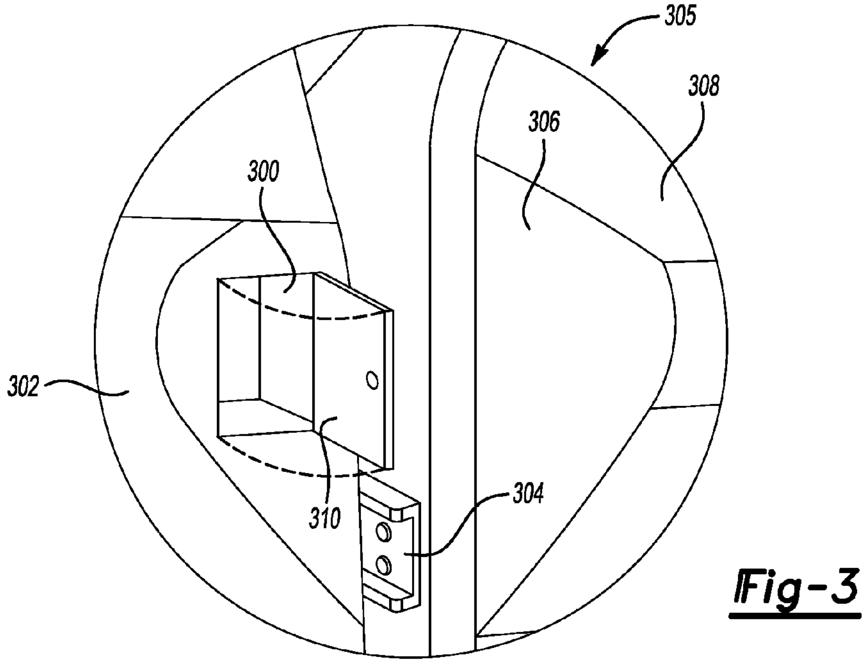
FIG. 3 is a fragmentary view of a vehicle door that has a secure storage compartment.

Referring to FIG. 3, an alternative storage compartment 300 is provided in a door 302 that is connected by hinges 304 to the vehicle 305. An end-cap 306 of a dashboard 308 is provided on the vehicle 305 that secures the storage compartment 300 when the vehicle door 302 is closed. A compartment door 310 is provided for the storage compartment 300 to secure loose articles within the storage compartment 300.

Figure 4:
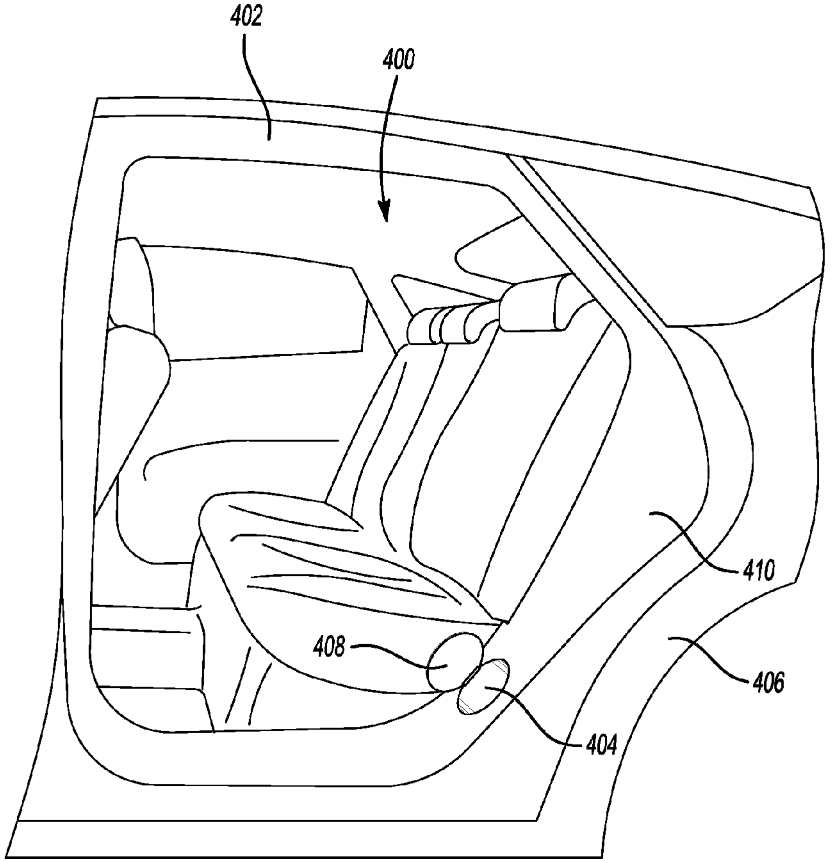
FIG. 4 is a fragmentary view of a vehicle that has a rear door storage compartment in the C-Pillar or wheel areas of the door frame that is inaccessible when the rear vehicle door is in the closed position.

Referring to FIG. 4, a rear seat area 400 of a vehicle 402 is illustrated. A storage compartment 404 is provided in the door frame possibly near the wheel housing 406 of the vehicle 402. The storage compartment 404 may be closed by a compartment door 408 to secure loose articles within the storage compartment 404. Alternatively, the storage compartment 404 could be provided in another area of the door frame such as in a C-pillar 410 located above the wheel housing 406.

Figure 5:
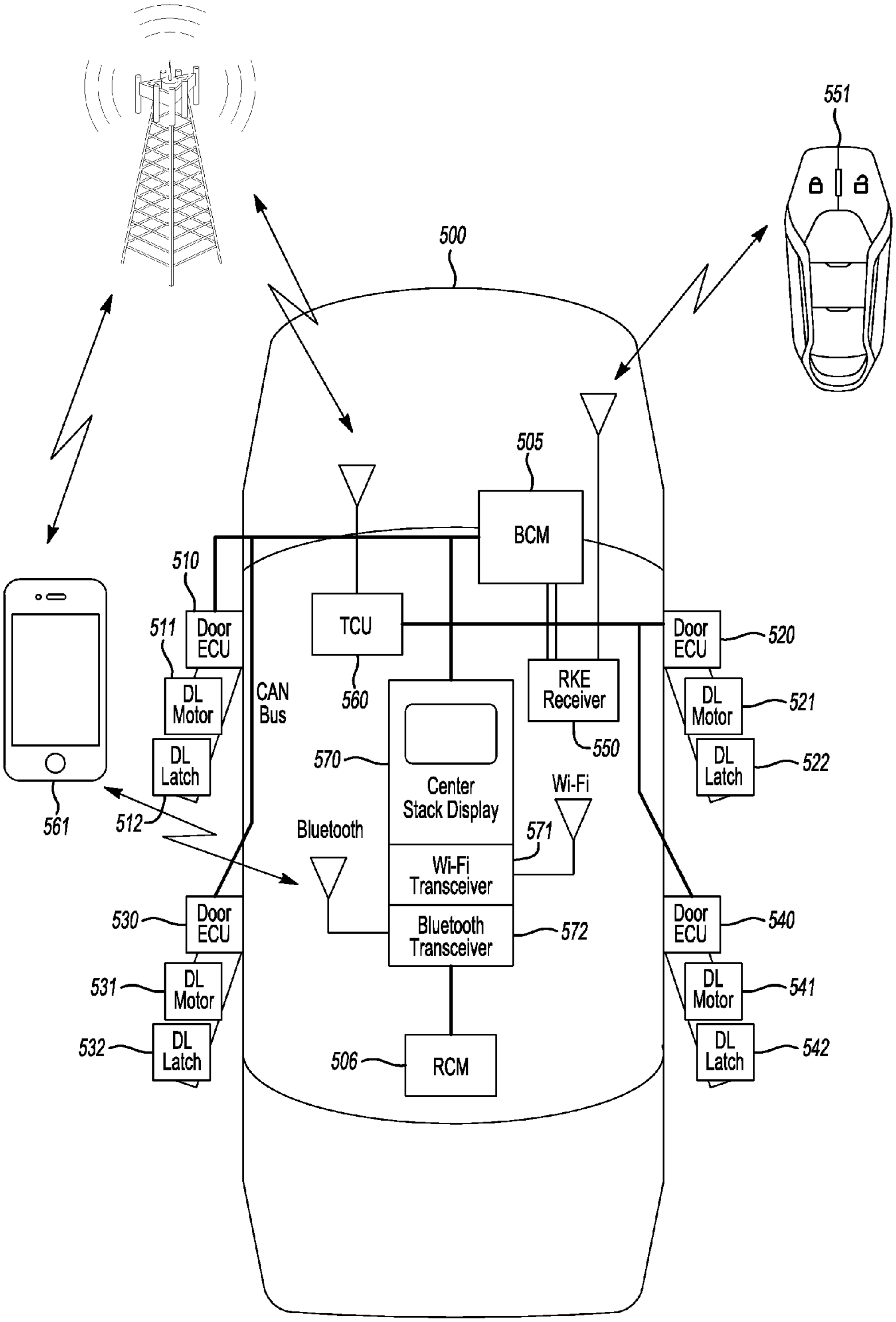
FIG. 5 is a vehicle block diagram of an electronic locking system with mechanical latches that uses Double-Locking or "Dead-Lock".

Vehicle system 500 shown in FIG. 5 illustrates a typical double-locking (DL) latching system. In DL systems, the latch 512, 522, 532, 542 is a purely mechanical latch that is actuated by cables or linkages between the external handle and the latch and between the internal handle and the latch. A locking motor assembly 511, 521, 531, 541 controlled by door ECU 510, 520, 530, 540 is used to toggle a mechanical gear in the mechanical latch between locked and unlocked states as controlled by the central body control module (BCM) 505. When locked, the door cannot be opened using the external handle but may be opened using the interior handle. Further, in DL systems, the locking motor assembly 511, 521, 531, 541 has a second motor that toggles a different gear that disassociates the interior handle from the mechanical latch 512, 522, 532, 542 such that the door will not unlatch if someone tries to open it from the interior handle. Once the vehicle system 500 is placed in the Double-Locked state when both the door is locked and the interior handle is disassociated, the vehicle system 500 will remain locked even if power is removed. The DL latching system is a highly secure form of security system that forces thieves to attack the vehicle through the windows.

Vehicles with DL typically only allow the feature to be enabled via a key-blade in the driver door, or a double-push and confirmation feedback mode via a key fob 551 to mitigate entrapment risks. Actuation of the DL latching system is not allowed when the vehicle is running or moving to expedite exit post-crash. Entry into DL via a cell phone 561 or other long distance remote device is not normally permitted due to the lack of visibility of the cabin.

In vehicle system 500, the subject small valuables safe or storage compartment 110, 300, 404, could be located on any or all doors in markets where DL is allowed and commonly used by customers. This would allow one or more passengers to have their own personal safe associated with each door. Further, because the DL state is maintained regardless of the availability of vehicle battery power, there is no need to relocate the hood release lever or door locking related power fuses to the door pillar. For the subject contents safe feature, only selected doors, but not all doors, are allowed to be placed in DL mode even if the remainder of the vehicle is unlocked. This allows the valuables safe feature to be provided on some but not all of the doors in vehicles that have the DL feature. One or more but not all doors may be designated as a Double Locked valuables safe that remains locked even if one or more of the other vehicle doors are unlocked. A rear door that is rarely used may be provided with the storage compartment 110, 300, 404. The rear door would then remain double-locked even when the other doors are unlocked to add greater security for the valuables safe when the vehicle is given to a valet or service person.

Depending on regulations in a given country, the door may be required to be removed from DL mode when the vehicle is running and/or in motion. In Europe, child locking of the rear doors via DL is permitted. Under this regulation, one or more rear doors may be provided with the valuable safe in DL mode when the vehicle is running provided they are removed from DL mode within a few seconds after a vehicle crash event. This can be accomplished by BCM 505 receiving a crash notification from the vehicle restraints control module (RCM) 507.

In a vehicle system 500 where not all doors are placed in DL mode, it may be preferable that the vehicle center stack display 570 or a remotely connected device such as a cell phone 561 be used as a graphic user interface (GUI) for configuration and selection of the door to be designated to lock to form the valuables safe. Communication between the configuration application GUI and the vehicle could be accomplished via Bluetooth between remote access device 561 and a vehicle Bluetooth transceiver 572. Alternatively, a cellular connection from remote access device 561 to a service delivery network may be used to communicate with a telematics control unit (TCU) or transceiver 560 located in the vehicle. Other access devices, such as a tablet or a personal computer (PC), may be interfaced with the vehicle.

To balance security and convenience, this GUI could allow the customer to specify vehicle operation states for the valuables safe to include one or more of the following features:

- specifying that the door(s) be placed in DL state;
- instructing that if the DL state is to be maintained when other doors are locked;
- instructing that the DL state is to be maintained when the vehicle is running;
- defining the code for unlocking the door from a phone 561 or the GUI 570;
- instructing to enter the DL valuable safe mode from the phone 561, vehicle GUI 570, or vehicle key fob 551; and/or
- instructing the vehicle to send an alert when the door has been unlocked via the code or the door was opened while in the DL valuables safe state, and other logical configurations.

On vehicles with an exterior door keypad the factory default code could be the same as the factory default keypad code and/or secondary custom codes that are allowed to be added. On vehicles without an exterior door keypad, the customer may select a code and program the valuables safe by some other secure means such as having both vehicle keys present and recognized when programming the valuables safe code.

Figure 6:
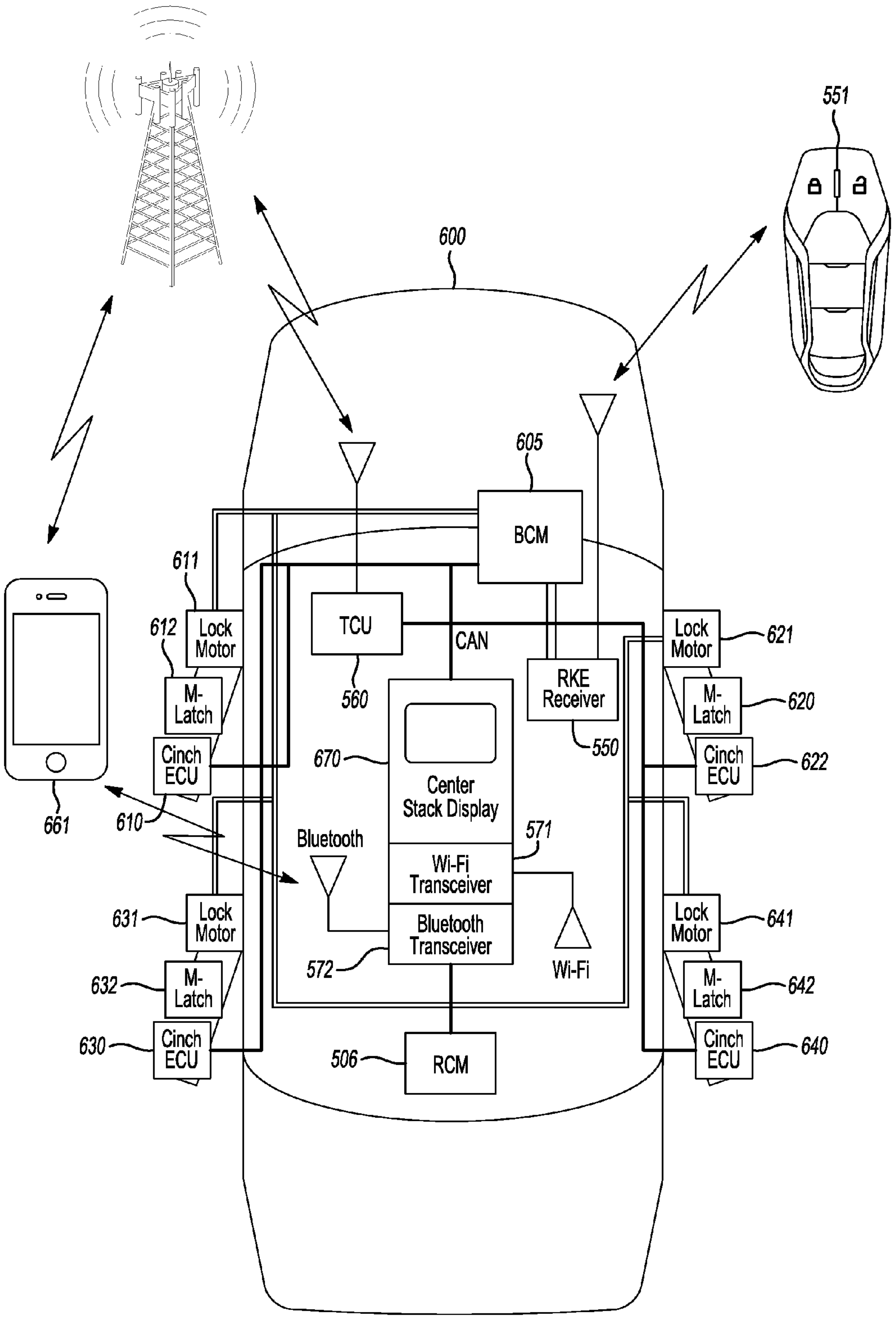
FIG. 6 is a vehicle block diagram of an electronic locking system with mechanical latches that uses a cinching motor and controller to cinch the doors closed.

Vehicle system 600 shown in FIG. 6 illustrates a typical standard locking latching system with an overlay cinching controller 610, 620, 630, 640 for the purpose of pulling the door firmly closed. A cinching apparatus can be incorporated in a door with a conventional mechanical latch or a door with an electronic latch (i.e., e-latch). Vehicle system 600 only addresses cinching a door closed with a mechanical latch. Cinching controllers are used in vehicle applications where it is desirable to increase the firmness or durometer of the rubber grommet around the door periphery to create a better seal. A firmer door seal reduces wind noise, road noise, and improves water sealing. A firm seal also comes with the trade-off as to higher door closing effort. When all the windows, moon roof, and other doors are closed, closing the remaining door works against both the air pressure of the cabin and the seal of the door being closed. Increasing the seal firmness makes it even harder to close. However, use of cinch motor and electronic cinching unit (ECU) controller allows the customer to gently close the door to a partially open position until the cinch controller catches the door in a "secondary position" where it is slightly ajar.

Once the ECU controller 610, 620, 630, 640 recognizes the door is in the secondary position, a pawl is driven by a cinch motor that pulls the door to its primary closed and latched position. Once the door has been verified by the ECU controller 610, 620, 630, 640 to be fully latched, the pawl will be driven back to an open waiting position for next door closing event. During the period where the pawl is cinching the door closed and is preparing to return to an open position (typically 2-3 seconds), the door cannot be opened from either the external or internal handle for this 2-3 second period. If the pawl is driven to a cinch position and remains in the cinched state, it cannot be overridden by a mechanical back-up handle or removal of main battery power. There is no need to relocate the hood release lever or cinch related power fuses to the door pillar because the cinch state is maintained regardless of the availability of vehicle battery power.

Double-Locking can be implemented by keeping the cinching pawl closed to create a valuables safe in vehicle system 600 by forcing all doors or one or more specified doors, into a state where the cinch pawl is fixed in the cinch (or closed) position until commanded otherwise to release.

Cinch based vehicle system 600 has a latch 612, 620, 632, 642 that is a purely mechanical latch that is actuated by cables or linkages between the external handle and the latch, and between the internal handle and latch. A locking motor assembly 611, 621, 631, 641 is controlled by BCM 505 to apply one of two voltage polarities to toggle a mechanical gear in the mechanical latch between locked and unlocked states. The central BCM 505 may be the arbitrator that establishes the locking state of the vehicle. When a door is open and pushed to the secondary latch position, the cinch controller ECU 610, 622, 630, 640 closes the cinch pawl that grabs the door and pulls it to primary latched position. The cinch pawl remains in the latch position until instructed otherwise if the valuables safe feature is enabled for the door. When cinched, the subject door cannot be opened using either the external handle or interior handle regardless of the lock state of the vehicle.

In vehicle system 600, the subject small valuables safe or safes 110, 300, 404, could be located on any or all doors in markets where DL is allowed and commonly used by customers. This allows one or more passengers to have their own personal safe associated with each door. Further, because the cinch state can be maintained regardless of the availability of vehicle battery power, there is no need to relocate the hood release lever or door locking related power fuses to the door pillar. Vehicle system 600 may prescribe that only selected doors, but not all doors, be allowed to be placed in a fixed cinch mode even if the remainder of the vehicle is unlocked. This allows the valuables safe feature to be provided on some but not all of the doors with the "Double-Lock" feature. One or more but not all of the doors may be designated as a fixed cinch valuables safe that remains locked even if one or more of the other vehicle doors are unlocked. A rear door that is rarely used may be provided with the valuable safe. The rear door would then remain in a fixed cinch state even when the other doors are unlocked to add greater security for the valuables safe when the vehicle is given to a valet or service person.

Depending on regulations in a given country, the door may be required to be removed from this fixed cinch (i.e., DL mode) when the vehicle is running and/or in motion. In Europe, child locking of the rear doors via DL is permitted. Under this regulation, one or more rear doors may be provided with the valuable safe in the fixed cinch mode when the vehicle is running provided these doors are removed from the fixed cinch state mode within a few seconds after a vehicle crash event. This can be accomplished by BCM 505 receiving a crash notification from the vehicle RCM 507.

In a vehicle system 600 where not all doors are placed in the fixed cinch state mode, it may be preferable that the vehicle center stack display 570 or a remotely connected device such as a cell phone 661 be used as a GUI for configuration and selection of the door to be designated to lock the valuables safe. Communication between the configuration application GUI and the vehicle could be accomplished via Bluetooth between remote access device 661 and a vehicle Bluetooth transceiver 572. Alternatively, a cellular connection from remote access device 661 to a service delivery network may be used to communicate with a telematics control unit (TCU) or transceiver 560 located in the vehicle. Other access devices, such as a tablet or a PC, may be interfaced with the vehicle.

To balance security and convenience, this GUI could allow the customer to specify vehicle operation states for the valuables safe to include one or more of the following features:

- specifying that the door(s) be placed in fixed cinch state;
- instructing that if the fixed cinch state is to be maintained when other doors are locked;
- instructing that if the fixed cinch state is to be maintained when the vehicle is running;
- defining the code for unlocking the door from a phone 661 or the GUI 570;
- instructing to enter the fixed cinch valuable safe mode from the phone 661, vehicle GUI 570, or vehicle key fob 551; and/or
- instructing the vehicle to send an alert when the door has been unlocked via the code or the door was opened while in the fixed cinch valuables safe state, and other logical configurations.

On vehicles with an exterior door keypad, the factory default code could be the same as the factory default keypad code and/or secondary custom codes that are allowed to be added. On vehicles without an exterior door keypad, the customer may select a code and program the valuables safe by some other secure means such as having both vehicle keys present and recognized when programming the valuables safe code.

Figure 7:
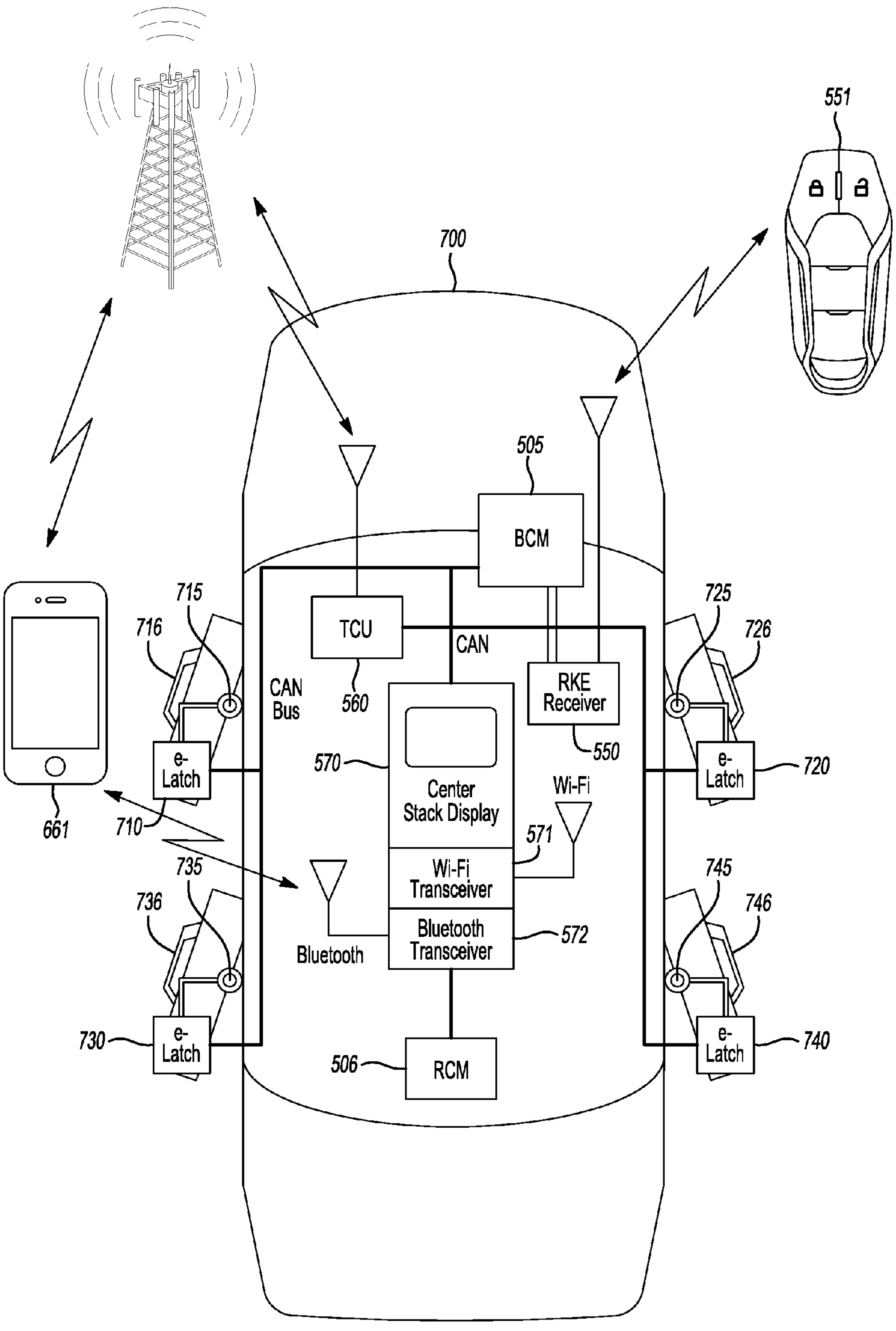
FIG. 7 is a vehicle block diagram of an electronic locking system with fully electronic latches, an electronic interior handle, and an electronic exterior handle.

Vehicle system 700 shown in FIG. 7 illustrates a typical electronic locking and electronic latching (e-latch) system without door cinching. In this system the exterior door handle 716,726,736,746 may include an electronic switch that is pressed when someone intends to open the door. When the external door handle switch is closed, it is read by the e-latch controller 710,720,730,740 and processed by sending a query to the vehicle BCM 505 for lock status. If the BCM 505 indicates to the e-latch controller that lock status is "unlocked", the e-latch controller 710,720,730,740 drives the door latch to an unlatched state allowing the door to be opened.

If vehicle is in a locked state when the BCM 505 receives the unlatch switch command signal from e-latch controller 710,720,730,740, the BCM 505 may perform a challenge/search for a smart key to determine if the lock state can be authorized to be unlocked. Once the Remote Keyless Entry ("RKE") receiver 550 receives confirmation from key fob 551, the vehicle BCM 505 transitions the vehicle to an unlocked status. If an exterior handle switch closure persists when the e-latch controller 710,720,730,740 is updated to unlock status, the e-latch controller drives the door latch to an unlatched state and allows the door to be opened.

In a similar fashion, the interior door handle 715, 725, 735, 745 (or unlatch button) may comprise a pushbutton switch or lever driven switch that is pressed to open the door. When the internal door "handle" switch is closed, it may also be read by the e-latch microcontroller 710, 720, 730, 740 and processed by sending a query to the vehicle 505 for lock status. If the BCM 505 indicates to the e-latch controller that lock status is "unlocked", the e-latch controller 710, 720, 730, 740 drives the door latch to an unlatched state allowing the door to be opened.

If the vehicle is in a locked state when the BCM 505 receives the unlatch switch command signal from e-latch controller 710, 720, 730, 740, the BCM 505 may instruct the center stack display 570 to display information as to the vehicle lock status, may initiate a piezoelectric chirp, or may blink a locking state LED that may be mounted on the door trim. The user may then manually unlock the door by pushing an unlock button that may be mounted on the interior face of the door arm rest. The user could also use the key fob to unlock the doors. Alternatively, the vehicle could be configured to automatically unlock the doors when the driver shifts the transmission to park.

If an interior handle switch closure persists after the e-latch controller 710, 720, 730, 740 is updated to unlock status, or if the unlatch button 715, 725, 735, 745 is pushed again after the transition to an unlocked state, then the e-latch controller may drive the door latch to an unlatched state allowing the door to be opened. Because the door handles and latches in such a system are 100% electrical, e-latch vehicles typically have either a back-up mechanical release cable or a handle that can open the door in the absence of power. Alternatively, the latch or vehicle system may have a secondary back-up power supply to power the latching control system if main vehicle power is lost. Some vehicle applications may have both a mechanical back-up release cable handle and a secondary back-up power supply.

Implementation of a valuables safe in this vehicle system 700 can be accomplished by simply ignoring the unlatch requests from the exterior door handle 716, 726, 736, 746 or the internal unlatch button 715, 725, 735, 745 when the door is placed in a valuables safe mode. However, unlike vehicle systems 500 and 600 where the door retains its latch state in the absence of power, vehicle system 700 allows an unlatch request to be processed if power is lost or if the mechanical release cable handle is pulled. In vehicle system 700, the hood release lever and e-latch related power fuses may be relocated to the door pillar or end cap so that they are inaccessible when the door is closed to optimize security. The valuables safe may only be allowed on doors without a mechanical back-up release, such as the rear doors on some e-latch vehicles, because it may not be possible to circumvent the mechanical release cable. The valuable safe feature may not be offered for systems that require a mechanical back-up release.

In vehicle system 700, the subject small valuables safe or safes 110, 300, 404, could be located on any or all doors or on dashboard end-caps in markets where DL is allowed and commonly used by customers. This would allow one or more passengers to have their own personal safe associated with each door. Vehicle system 700 may prescribe that only selected doors, but not all doors, be allowed to be placed in a valuables safe mode even if the remainder of the vehicle was unlocked. This allows the valuables safe feature to be provided on some, but not all of the doors that have the "Double-Lock" feature. One or more but not all doors may be designated as a valuables safe that remains locked even if one or more of the other vehicle doors are unlocked. A rear door that is rarely used may be provided with the valuable safe. The rear door would then remain in a fixed latched state even when the other doors are unlocked to add greater security for the valuables safe when the vehicle is given to a valet or service person.

Depending on regulations in a given country, the door may be required to be removed from this fixed latch state (i.e., DL mode) when the vehicle is running and/or in motion. In Europe, child locking of the rear doors via DL is permitted. Under this regulation, one or more rear doors may be provided with the valuable safe in the fixed latched mode when the vehicle is running provided these doors are removed from the fixed latched state within a few seconds after a vehicle crash event. This can be accomplished by BCM 505 receiving a crash notification from the vehicle RCM 507.

In a vehicle system 700 where not all doors are placed in the fixed latched state mode, it may be preferable that the vehicle center stack display 570 or a remotely connected device such as a cell phone 761 be used as a GUI for configuration and selection of the door to be designated to be locked as the valuables safe. Communication between the configuration application GUI and the vehicle could be accomplished via Bluetooth between remote access device 761 and a vehicle Bluetooth transceiver 572. Alternatively, a cellular connection from remote access device 761 to a service delivery network may be used to communicate with a TCU or transceiver 560 located in the vehicle. Other access devices such as a tablet or a PC may be interfaced with the vehicle.

To balance security and convenience, this GUI could allow the customer to specify vehicle operation states for the valuables safe to include one or more of the following features:

- specifying that the door(s) be placed in fixed latched/DL state;
- instructing that if the fixed latched state is to be maintained when other doors are locked;
- instructing that if the fixed latched state is to be maintained when the vehicle is running;
- defining the code for unlocking the door from a phone 761 or the vehicle GUI 570;
- instructions for entering the fixed latched valuable safe mode from the phone 761, vehicle GUI 570, or vehicle key fob 551; and/or
- instructing the vehicle to send an alert when the door has been unlocked via the code or the door was opened while in the fixed latched valuables safe state, and other logical configurations.

On vehicles with an exterior door keypad, the factory default code may be set to the same as the factory default keypad code and/or secondary custom codes that are allowed to be added. On vehicles without an exterior door keypad, the vehicle owner may select a code and program the valuables safe by some other secure means such as having both vehicle keys present and recognized when programming the valuables safe code.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A storage compartment that is secured by a closed door of a vehicle, the compartment comprising:

- a door latch for holding the door closed over the storage compartment that has a locked condition and an unlocked condition;
- a lock actuator for selecting the locked condition and unlocked condition;
- a lock actuator override control that prevents the lock actuator from being placed in the unlocked condition when the lock actuator override control is activated to prevent the door from being opened and allowing access to the storage compartment.

2. The compartment of claim 1 wherein the door latch includes an inside electronic door handle and an outside electronic door handle, and wherein the lock actuator override control disables the inside electronic door handle and the outside electronic door handle.

3. The compartment of claim 2 wherein the inside electronic door handle and the outside electronic door handle include electronic switches that process a switch command when the override control is deactivated and are prevented from processing the switch command when the lock actuator override control is activated.

4. The compartment of claim 1 wherein the door latch includes a cinching door system for closing the door, and wherein the lock actuator override control renders the cinching door system inoperable in a safe lock mode and operable when not in the safe lock mode.

5. The compartment of claim 4 wherein the cinching system has a catch that engages the door to close the door and that releases the door to allow the door to open, and wherein the override control when activated prevents the cinching system from releasing the door.

6. The compartment of claim 1 wherein the storage compartment is disposed in the end-cap of the vehicle dashboard.

7. The compartment of claim 1 wherein the storage compartment is disposed in the vehicle door.

8. The compartment of claim 1 wherein the storage compartment is disposed in a portion of a door frame.

9. A system for preventing access to a storage compartment comprising:

- a vehicle door that is closed preventing access to the storage compartment and that includes an inside electronic door handle and an outside electronic door handle;
- an override control operatively connected to the inside door handle and the outside door handle to selectively render the inside door handle and the outside door handle inoperable in a safe lock mode and operable when not in the safe lock mode.

10. The system of claim 9 wherein the inside door handle and the outside door handle include electronic switches that process a switch command when the override control is deactivated and are prevented from processing the switch command when the override control is activated.

11. The system of claim 9 wherein at least one vehicle door that is closed to prevent access to the storage compartment is operatively connected to the override control.

12. The system of claim 9 wherein the override control is activated and deactivated by an actuator selected from the group consisting of:

- a graphic user interface in the vehicle;
- a portable radio frequency switch; and
- a signal sent to a vehicle telematics controller.

13. A system for preventing access to a storage compartment comprising:

- a vehicle door that is closed preventing access to the storage compartment and that includes a cinching system for closing the door;
- an override control operatively connected to the cinching system that renders the cinching door system inoperable in a safe lock mode and operable when not in the safe lock mode.

14. The system of claim 13 wherein the cinching system has a catch that engages the door to close the door and that releases the door to allow the door to be opened, and wherein the override control when activated prevents the cinching system from allowing the release of the door.

15. The system of claim 14 wherein the cinching system includes a motor that pulls the door closed to engage a primary latch as the motor rotates in one rotary direction and that releases the door to allow the door to be opened by rotating in the opposite rotary direction, and wherein the override control prevents the door from being released by preventing the motor from rotating in the opposite rotary direction.

16. The system of claim 15 wherein the primary latch is releasable by at least one door handle when the override control is not activated and is prevented from releasing when the primary latch is activated.

17. The system of claim 13 wherein the override control is activated and deactivated by an actuator selected from the group consisting of:

a graphic user interface in the vehicle;

a portable radio frequency switch; and a signal sent to a vehicle telematics controller.

* * * * *